Jan. 23, 1968  T. B. LUDLOW  3,365,116
MULTI-PLY BAG
Filed April 27, 1967  3 Sheets-Sheet 3

3,365,116
MULTI-PLY BAG
Thomas B. Ludlow, St. Paul, Minn., assignor to Bemis Company, Inc., Minneapolis, Minn., a corporation of Missouri
Filed Apr. 27, 1967, Ser. No. 634,164
10 Claims. (Cl. 229—55)

ABSTRACT OF THE DISCLOSURE

A multi-ply bag having opposed front and rear walls, the innermost ply being of polyethylene and the remainder of paper. The bag has closure flaps extending from the front wall at one end of the bag and from the back wall at the other end. An end closure is provided at either or both ends of the bag by folding over the end flap of each ply and securing it to its respective ply on the other wall, thus interleaving each of the end flaps, other than the end flap of the outer ply, between the other wall of the same ply and the wall of the next successive ply. The ends of the inner polyethylene liner are heat sealed and are folded over and tucked between the inner two paper plies, and the outer ply is polyethylene coated and the end flap thereof is folded over and heat sealed to the other wall of the same ply.

Background of the invention

This invention relates to bags, and more particularly to a multi-ply dunnage bag having unique end closures.

Dunnage bags are bags which are inflated with air and disposed, for example, between pallets of freight in a freight car of a train. The bags serve to cushion and prevent excessive shifting of the freight as the car accelerates and decelerates, thereby to prevent the freight from becoming damaged. Since such bags are subjected to repeated impact by the shifting freight, they must be of sound construction and have strong and durable end closures.

Summary of the invention

A multi-ply bag of this invention is comprised of first and second opposed walls, certain plies of the first wall having extensions at one end of the bag beyond the respective end edge of the second wall, the extensions constituting closure flaps. The flaps on the plies of the first wall are folded over on a fold line generally coincident with the end edge of the second wall and are secured to the respective ply of the second wall. Certain of the flaps are interleaved between the plies of the second wall. The invention, therefore, attains the object of providing a bag of the character described which is of sound construction and has strong and durable end closures. While the invention has been developed principally for use as a dunnage bag, and is so described hereinafter, it will be understood that it is not limited to use for this purpose but may find use as a container for storing and transporting various types of flowable materials. Other objects and features will be in part apparent and in part pointed out hereinafter.

Brief description of the drawings

FIG. 1A is a front elevation of a completed bag;

FIG. 2A is a rear elevation of a completed bag;

Corresponding reference characters indicate corresponding parts throughout the several views of the drawings.

Description of the preferred embodiment

Figure 3:
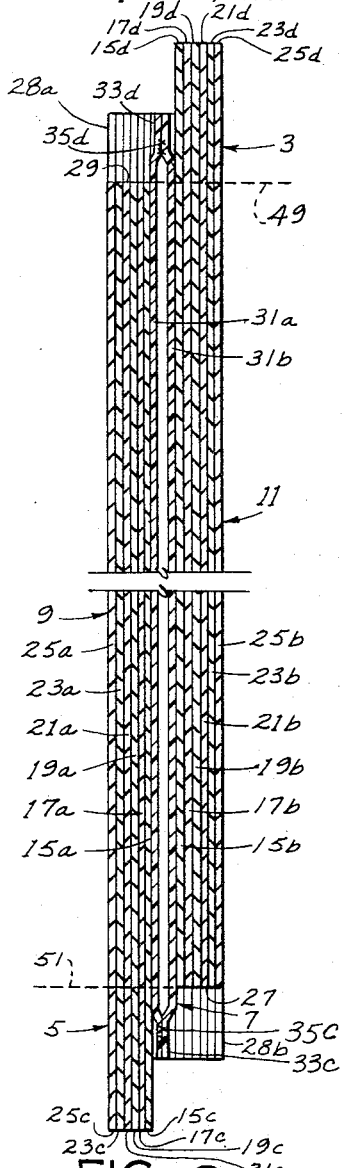
FIG. 3 is a vertical section of the bag taken on line 3—3 of FIG. 1, broken away at the center.
Figure 4:
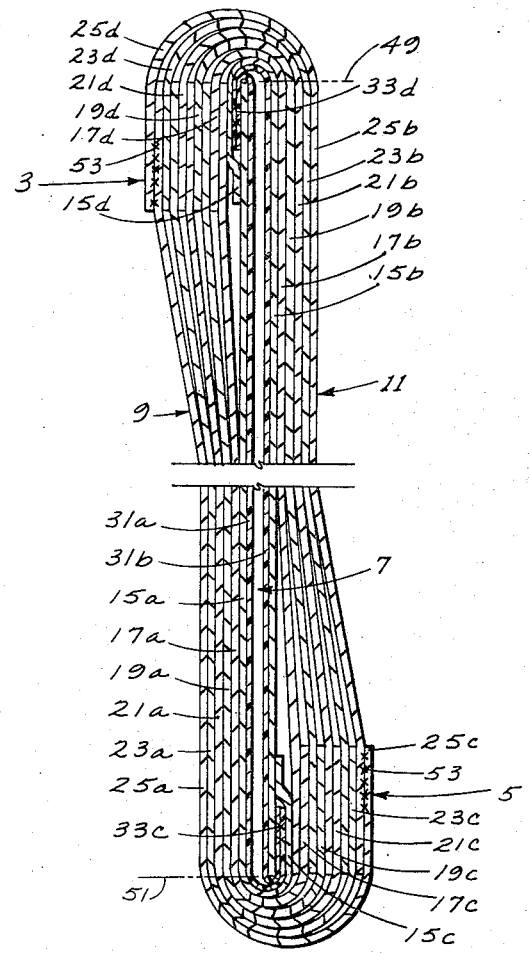
FIG. 4 is a vertical section of the bag taken on line 4—4 of FIG. 1A, broken away at the center.
Figure 5:
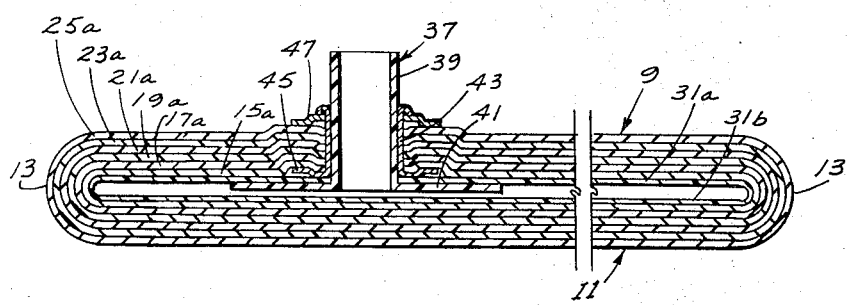
FIG. 5 is a horizontal section on line 5—5 of FIG. 1A, partly broken away.

Referring to the drawings, there is indicated at 1 a bag of this invention having end closures 3 and 5. The bag is a multi-ply bag, made of a plurality of plies of paper and having a heat sealable inner plastic liner or bladder 7. As shown in FIGS. 3–5, the bag has six paper plies, thus, in effect, consisting of six concentric paper tubes and the plastic liner tube 7. The opposed walls of the bag are designated 9 and 11. These are joined at folds 13 at the sides of the bag. The six paper plies in the first or front wall 9 are designated 15a, 17a, 19a, 21a, 23a and 25a in order from the inner paper ply to the outer paper ply. Each of the plies 15a–25a is provided with a trapezoidal cut-out at the top of the bag forming a pair of triangular side portions 26a and 28a (see FIG. 1). The six paper plies in the second or back wall 11 are designated 15b, 17b, 19b, 21b, 23b and 25b also in order from the inner paper ply to the outer paper ply, and are similarly cut-out to form triangular side portions 26b and 28b.

Figure 1:
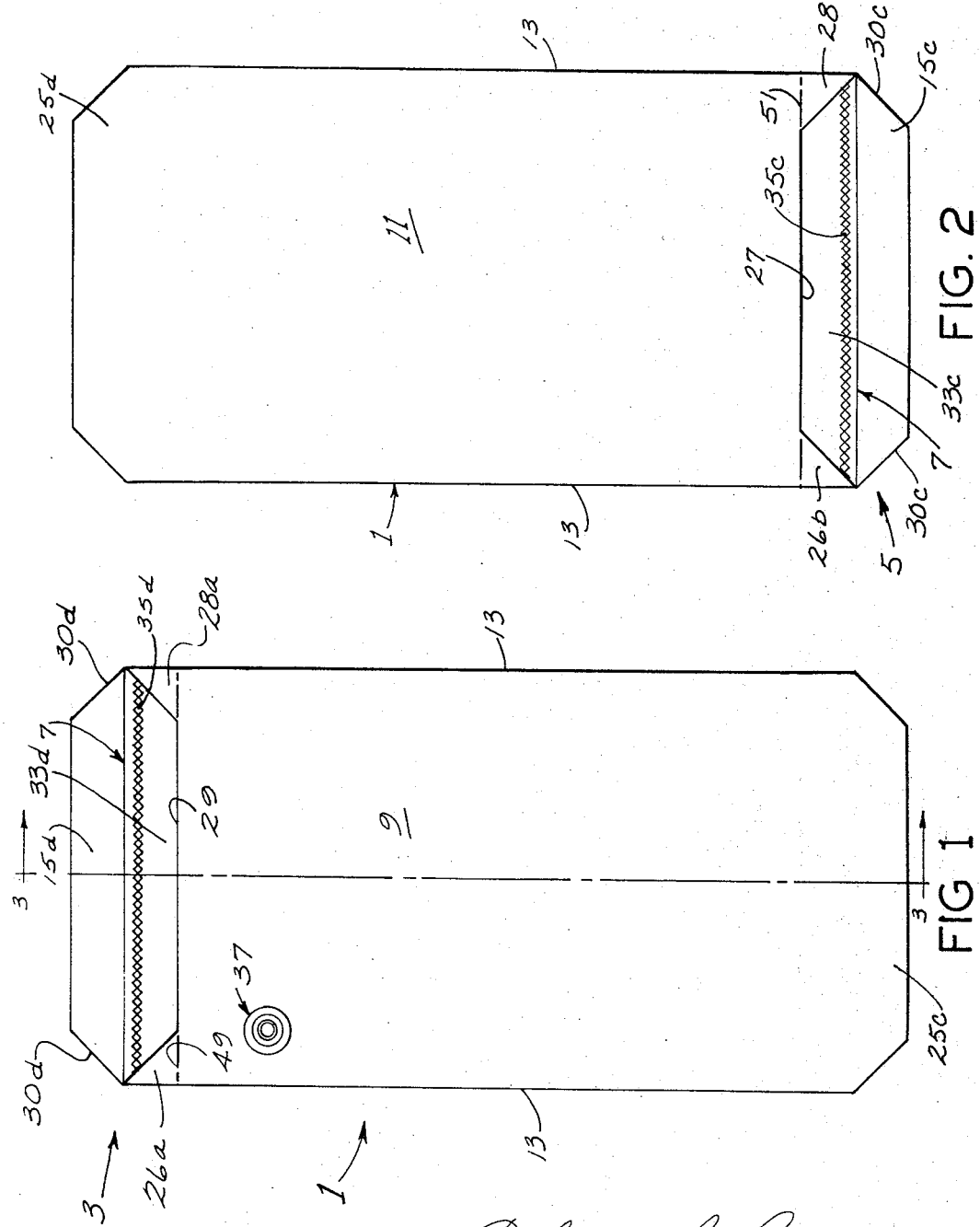
FIG. 1 is a front elevation of the present bag prior to forming the end closures.
Figure 2:
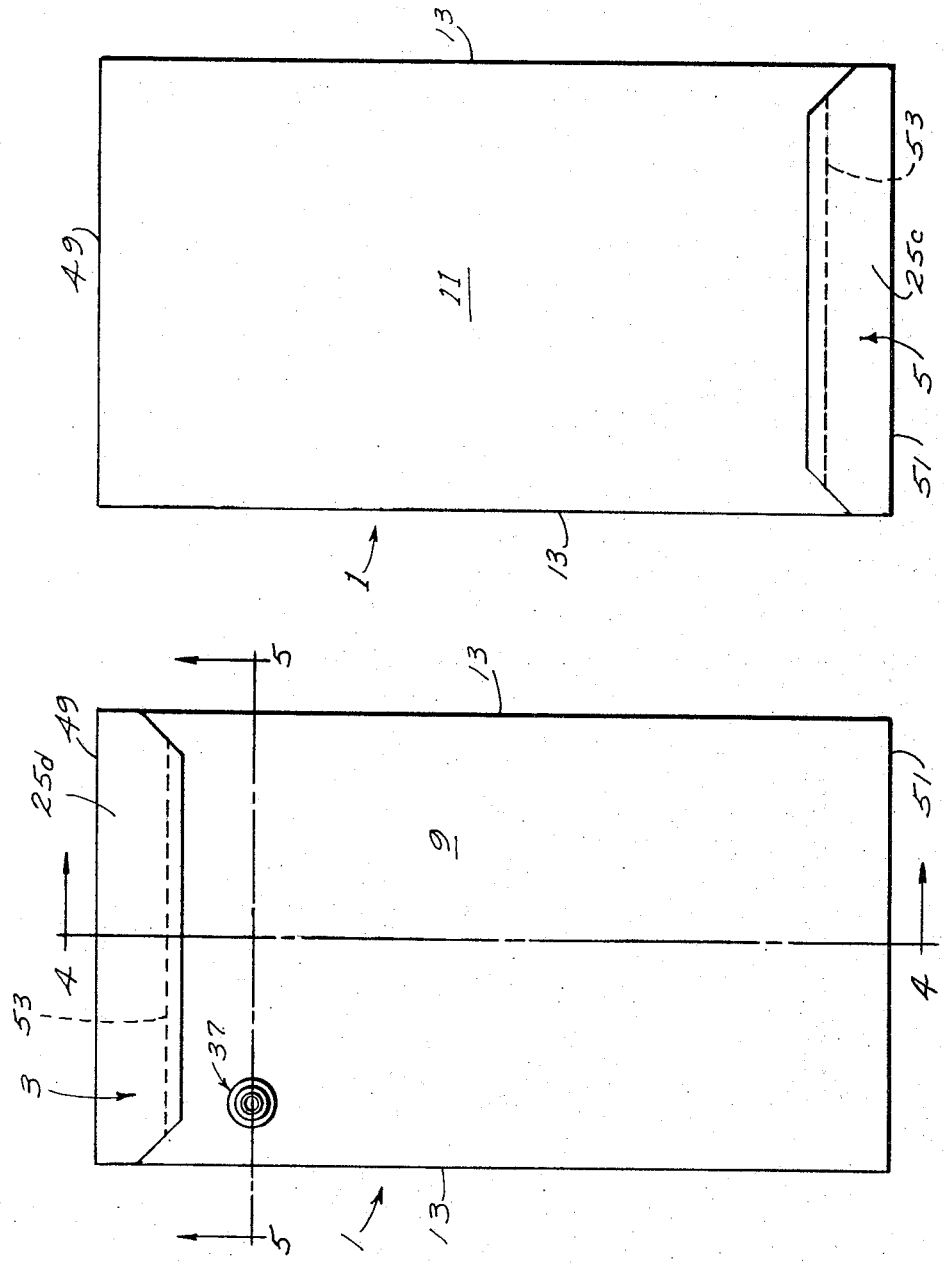
FIG. 2 is a rear elevation of the bag prior to forming the end closures.

The plies of the front wall 9 have extensions at the lower end of the bag beyond the respective end edge 27 of the back wall constituting closure flaps 15c, 17c, 19c, 21c, 23c and 25c of end closure 5. Similarly, the plies of the back wall 11 have extensions at the upper end of the bag beyond the respective end edge 29 of the front wall constituting closure flaps 15d, 17d, 19d, 21d, 23d and 25d of end closure 3. As illustrated in FIGS. 1 and 2, the corners of closure flaps 15c–25c and 15d–25d are cut-off at an angle, as indicated at 30c and 30d, respectively.

The inner plastic liner 7 is a tube having front and back walls 31a and 31b. It has lower and upper ends 33c and 33d, respectively, extending beyond the front and rear wall end edges 27 and 29 but terminating short of the ends of closure flaps 15c–25c and 15d–25d. The ends 33c and 33d are heat sealed together on a line of seal extending across the width of the liner, as indicated at 35c and 35d.

As best illustrated in FIGS. 1A and 5, the bag 1 is provided with a filler fitting 37 extending through the plies of the front wall 9 and the wall 31a of the plastic liner 7. The fitting is comprised of a tubular member 39 having a circular flange 41 at its base, the latter being secured to the inside of wall 31a of liner 7. A tubular metal sleeve 43 having a bottom flange 45 disposed between ply 15a and wall 31a engages a washer 47 at its outer end for crimping the plies 15a–25a together to form a bore through the wall for the passage of tubular barrel 39. Thus, communication is established with the inside of liner 7 through the tube 39.

Referring to FIG. 4, the end closures 3 and 5 are formed by successively folding the closure flaps 15c–25c and 15d–25d over on fold lines 49 and 51, the latter being generally coincident with the end edges 29 and 27, respectively, of walls 9 and 11. As regards the upper end closure 3, the end 33d of liner 7 and the closure flap 15d of ply 15b are folded over on line 49 and interleaved between the plies 15a and 17a of front wall 9, and the flap 15d is secured, as by adhesive bonding, to the outside of ply 15a. Closure flap 17d is folded over on line 49 and is interleaved between plies 17a and 19a and bonded to the outside of ply 17a. Closure flaps 19d, 21d and 23d are individually and successively folded over on fold line 49, interleaved between the plies of front wall 9 and bonded to their respective plies. To complete the end closure 3, the outer closure flap 25d is folded over on line 49 and secured, in a manner to be hereinafter described, to the outside of outer ply 25a, as indicated at 53.

The lower end closure 5 is formed in the same manner as the upper end closure 3. That is, the closure flap 15c and the end 33c of liner 7 are folded over on line 51 and interleaved between the plies 15b and 17b of wall 11, and the flap 15c is glued to the outside of ply 15b. Each of the remaining flaps 17c, 19c, 21c and 23c are then successively folded over on fold line 51, interleaved between the plies of wall 11 and glued to their respective plies 17b, 19b, 21b and 23b. Lastly, the outer flap 25c is folded on line 51 and is secured at 53 to the outside of ply 25b. The angular cuts 30c and 30d at the corners of the closure flaps simplify the interleaving and bonding operations and provide smoother end closures at the edges of the bag. In addition, the triangular portions 26a, b and 28a, b serve to protect the edges of the liner 7 when the end closures are completed.

The inner liner is preferably a length of seamless polyolefin tubing, for example, of 0.006 inch thick high density ethylene butene-1 copolymer and polyisobutylene. Other seamless or seamed polyethylene bladders may also be used, depending upon the particular application for the bag. The paper plies are preferably each of 100 pound basis weight paper with the outer ply 25a and 25b being polyethylene coated for protection against moisture. The inner five plies of paper are adhered at the closure ends with pressure sensitive adhesive while the outer ply, being polyethylene coated, is heat sealed to itself through the use of a strip of polyethylene or a strip of paper tape coated on both sides with heat seal adhesive. Since the inner liner 7 is formed of polyethylene, the ends 33c and 33d are heat sealed, as at 35, by the use of conventional heat sealing apparatus. With the ends of liner 7 folded over and trapped in the top and bottom end closures, the seals 35c and 35d are isolated from the pressure or contents of the bag.

Thus, the completed bag is made of six plies of paper and a sealed inner liner or bladder of polyethylene, with end closures at each end and a filler tube for filling the bag. If the bag is to be used as a dunnage bag, the inner liner is inflated through the filler tube 39 and the latter is sealed in any suitable manner. Alternatively, the ability of the bag to withstand fairly high pressures makes it suitable for use as a container for liquid or solid flowable materials. Specifically, such materials could be water, liquid or granular fertilizer, plastic resins, gasoline or fuel oil. Of course, the filler tube could be modified to facilitate filling and emptying of the container, and the liner material selected in accordance with the particular material to be contained. If desired, only the bottom end closure may be formed by the bag manufacturer, leaving the top open for filling and subsequent closing by the bag filler. In such case, the filler tube may be completely omitted. It will also be understood that the bag may be made of any number of plies, this being determined by the required strength of the bag and its ultimate use.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A multi-ply bag having first and second opposed walls, certain plies of the first wall having extensions at one end of the bag beyond the respective end edge of the second wall constituting first closure flaps, the flaps on said plies of the first wall being folded over on a fold line generally coincident with said end edge of the second wall and secured to the respective ply of the second wall, certain of said first flaps being interleaved between the plies of the second wall.

2. A bag as set forth in claim 1 wherein the flaps on said plies of the first wall are folded over on the outside of the respective ply of the second wall, whereby the flaps, other than that on the outer ply, are interleaved between the plies of the second wall, and the flap on the outer ply of the first wall is secured to the outside of the outer ply of the second wall.

3. A bag as set forth in claim 1 having a liner constituted by a plastic tube, said liner extending at said one end of the bag beyond said end edge of said second wall but terminating short of the end edges of said first flaps, said liner being sealed along a line of seal extending across the liner outward of said end edge of said second wall, and the portion of said liner which extends beyond said end edge of said second wall being folded over on said fold line with said first flaps.

4. A bag as set forth in claim 3 wherein both ends are closed and a filler tube is provided extending through one of said first or second walls.

5. A bag as set forth in claim 1 wherein certain plies of the second wall have extensions at the other end of the bag beyond the respective end edge of the first wall constituting second closure flaps, the flaps on said plies of said second wall being folded over on a fold line generally coincident with said end edge of the first wall and secured to the respective ply of the first wall, certain of said second flaps being interleaved between the plies of the first wall.

6. A bag as set forth in claim 5 wherein the second flaps are folded over on the outside of the respective ply of the first wall, whereby the flaps, other than that on the outer ply, are interleaved between the plies of the first wall, and the flap on the outer ply of the second wall is secured to the outside of the outer ply of the first wall.

7. A bag as set forth in claim 5 wherein said liner extends at the other end of the bag beyond the end edge of said first wall but terminates short of the end edges of said second flaps, said liner being sealed along a line of seal extending across the liner outward of said end edge of said first wall, and the portion of said liner which extends beyond said end edge of said first wall being folded over on said fold line with said second flaps.

8. A bag as set forth in claim 7 further comprising a filler tube extending through said plurality of plies of said first or second wall.

9. A bag as set forth in claim 7 wherein the outer ply is polyethylene coated and the first and second closure flaps of said outer ply are heat sealed to the second and first walls, respectively.

10. A bag as set forth in claim 1 wherein the corners of said first closure flaps are cut-off at angles, thereby to simplify interleaving between the plies of the second wall.

References Cited

UNITED STATES PATENTS

| | | | |
|---|---|---|---|
| 421,191 | 2/1890 | Porter | 229—57 |
| 2,975,955 | 3/1961 | McCurry | 229—55 |

DAVID M. BOCKENEK, *Primary Examiner.*